United States Patent [19]

Sugaya

[11] Patent Number: 4,891,800

[45] Date of Patent: Jan. 2, 1990

[54] OPTICAL RECORDING DISC

[75] Inventor: Syoji Sugaya, Nishinomiya, Japan

[73] Assignee: Sanyo Electric Company, Ltd., Moriguchi, Japan

[21] Appl. No.: 133,030

[22] Filed: Dec. 15, 1987

[30] Foreign Application Priority Data

Aug. 5, 1987 [JP] Japan ................................ 62-196118

[51] Int. Cl.⁴ ................................................ G11B 7/24
[52] U.S. Cl. ................................................... 369/275
[58] Field of Search ........................ 369/109, 110, 275; 358/342; 346/76 L, 135.1

[56] References Cited

U.S. PATENT DOCUMENTS

| 4,581,317 | 4/1986 | Simmons, III | 346/135.1 |
| 4,614,951 | 9/1986 | Osato et al. | 346/135.1 |
| 4,678,736 | 7/1987 | Hanamura et al. | 346/135.1 |
| 4,719,613 | 1/1988 | Hirose et al. | 369/275 |

FOREIGN PATENT DOCUMENTS 60194720 of 0000 Japan .

Primary Examiner—Donald McElheny, Jr.
Attorney, Agent, or Firm—Darby & Darby

[57] ABSTRACT

An optical recording disc provided with a substrate permeable to a red laser beam for reading data recorded and having a single pass transmissivity of 85% or more in a wave length region of said laser beam and a light absorption edge of shorter wave length side positioned at 600 nm or more and capable of preventing a misregeneration due to an external light having been incident upon an optical system without reducing the regenerating performance.

12 Claims, 3 Drawing Sheets

OPTICAL RECORDING DISC

BACKGROUND OF THE INVENTION

1. Field of the Invention

The present invention relates to an optical recording disc such as a compact disc and an optical video disc and the like.

2. Description of the Prior Art

A disc recording digital audio data optically, which is called a compact disc, has been known and described in for example "Hoso Gijutsu", April, 1981, pp. 316 and 317 and "Nikkei Electronics", Aug, 17, 1981, pp. 187 and 206.

FIG. 1 shows a construction of the conventional general compact disc. Data are recorded on one surface of a disc-like substrate (1) formed of transparent polycarbonate in the form of pits (dented portions), an aluminium reflecting film (2) being provided on said disk-like substrate (1), and an ultra-violet ray setting type resin protection layer (3) being provided on said aluminium reflecting film (2). And, a label (4) is silk-printed on said resin protection layer (3). The disc is nearly 1.2 mm thick.

And, the data recorded on the above described disc are read out and regenerated as follows. That is to say, in an optical system shown in FIG. 2 a laser beam, which has been irradiated from a semi-conductor laser (5), is turned into parallel lights by a first lens (6) and the resulting parallel lights make a rectilinear propagation through a beam-splitter (7) and then converted from a linear polarized light to a circular polarized light by a ¼-wave length plate (8) to be collected on a disc (10) through a second lens (9).

The laser beam, which has reached the above described disc (10), is transmitted through the substrate (1) and then reflected by the reflecting film (2) to be again transmitted through the substrate (1) followed by turning into the parallel lights by the second lens (9). Subsequently, the resulting parallel lights are converted from the circular polarized light to the linear polarized light by the 1/4-wave length plate (8) and then arrive at the beam-splitter (7). Such the reflected laser beam that has arrived at the beam-splitter (7) is turned by 90° in progressive direction there to be collected by a third lens (11). The collected reflected laser beam is incident upon a signal-detecting photo-sensor (12), whereby the data are read out to be regene/rated as audio-signals thereof or used as servo signals of a disc-driving motor and pick-up driving means (not shown).

The light incident upon the substrate is generally a red laser beam having a wave length of about 780 nm.

On the other hand, transparent polycarbonate having nearly uniform light transmission characteristics in a visible wave length region, as shown in FIG. 3, has been used as a substrate, not only the red laser beam but also visible rays being easily transmitted therethrough, so that in the case where strong noise lights are incident upon the disc in the visible ray region, they are transmitted through the substrate. If the transmitted noise lights are incident upon the sensor, noise signals are added to the data signals.

As a result, in some extreme cases, there is the possibility that the data are misread and an unstable servo occurs when a sensor output is used as a servo signal.

SUMMARY OF THE INVENTION

A first object of this invention is to provide an optical recording disc adapted not to produce an data-misreading and servo-trouble by providing a substrate having a single pass transmissivity of a red laser beam for reading out recorded data of 85% or more and an optical absorption edge of short wave length side of 600 nm or more.

A second object of this invention is to provide an optical recording disc capable of reading and regenerating by means of the conventional reading and regenerating device as it is.

A third object of this invention is to provide an optical recording disc possible to be manufactured in the same process as the conventional one and preventing the misreading and servo-trouble from occurring.

The above and further objects and features of the invention will more fully be apparent from the following detailed description with accompanying drawings.

DESCRIPTION OF THE PREFERRED EMBODIMENTS

Figure 1:
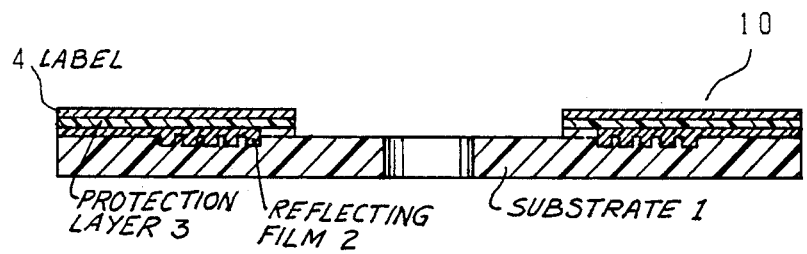
FIG. 1 is a longitudinal sectional view showing the conventional optical recording disc.
Figure 2:
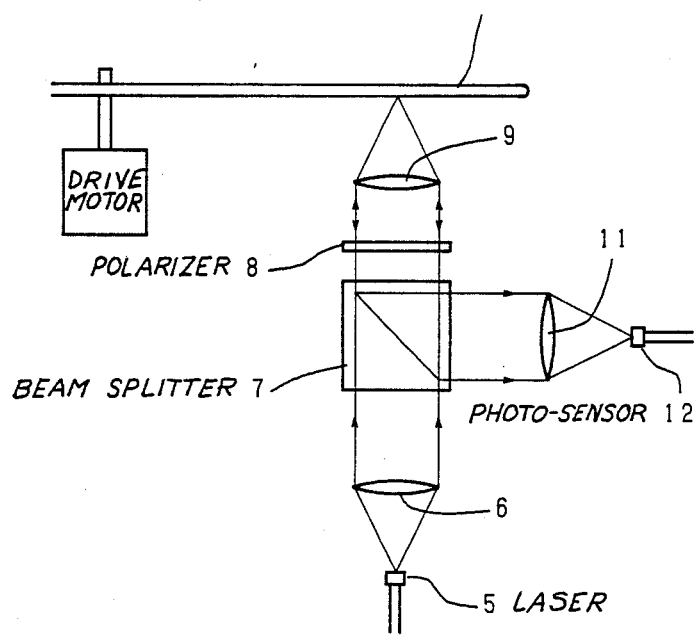
FIG. 2 is a schematic diagram showing an optical reading system of the optical recording disc.
Figure 3:
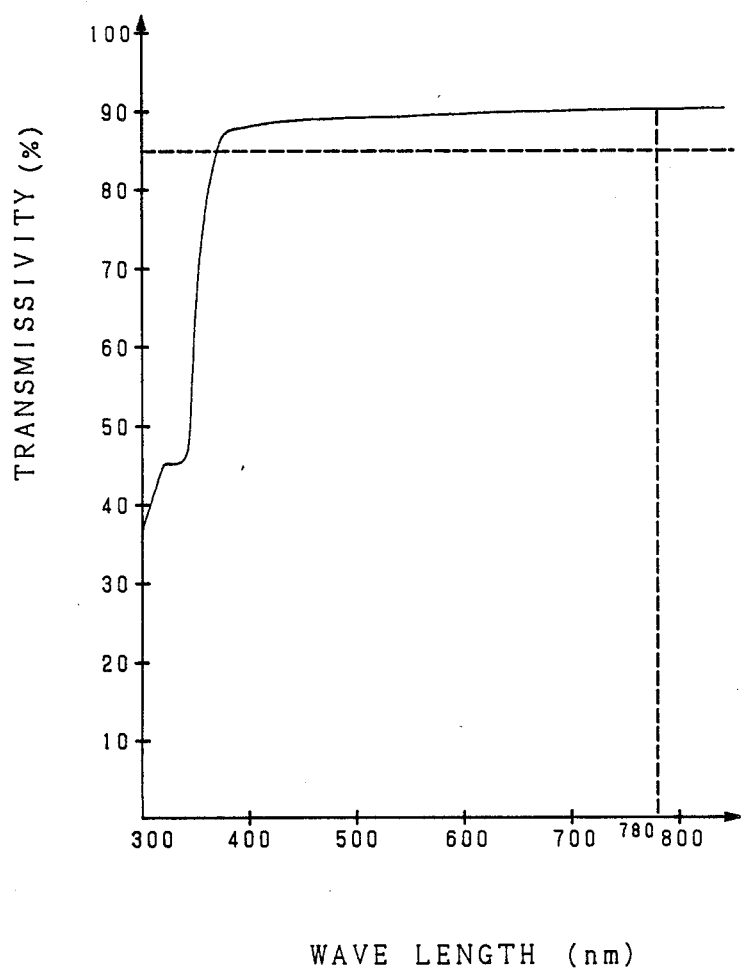
FIG. 3 is a diagram showing light transmission characteristics of the conventional optical recording disc.
Figure 4:
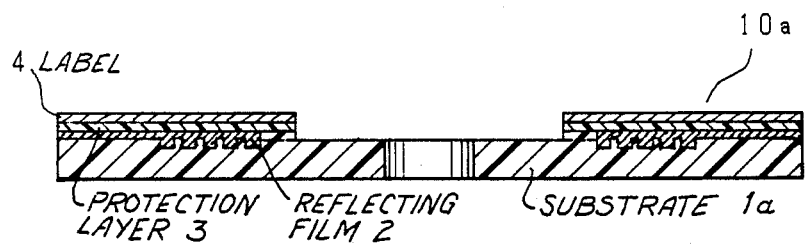
FIG. 4 is a longitudinal sectional view showing an optical recording disc according to the present invention.

FIG. 4 is a sectional view showing a construction of an optical recording disc 10a according to the present invention. The data are recorded on one surface of a translucent red substrate 1a formed of polycarbonate in the form of pits, an aluminium reflecting film 2 being provided on the substrate 1a, a resin protection layer of ultra-violet ray setting type 3 being provided on the aluminium reflecting film 2, and a label 4 being silk-printed on the resin protection layer 3. A thickness amounts to about 1.2 mm in all. As obvious from the above description, the disc according to the present invention is different from the conventional disc only in substrate 1a.

The substrate 1a has a single pass transmissivity in a wave length region of a red laser (wave length region with about 780 nm as a center) of a data-reading device. This is a value required for carrying out a highly reliable reading of the data by the red laser beam.

Figure 5:
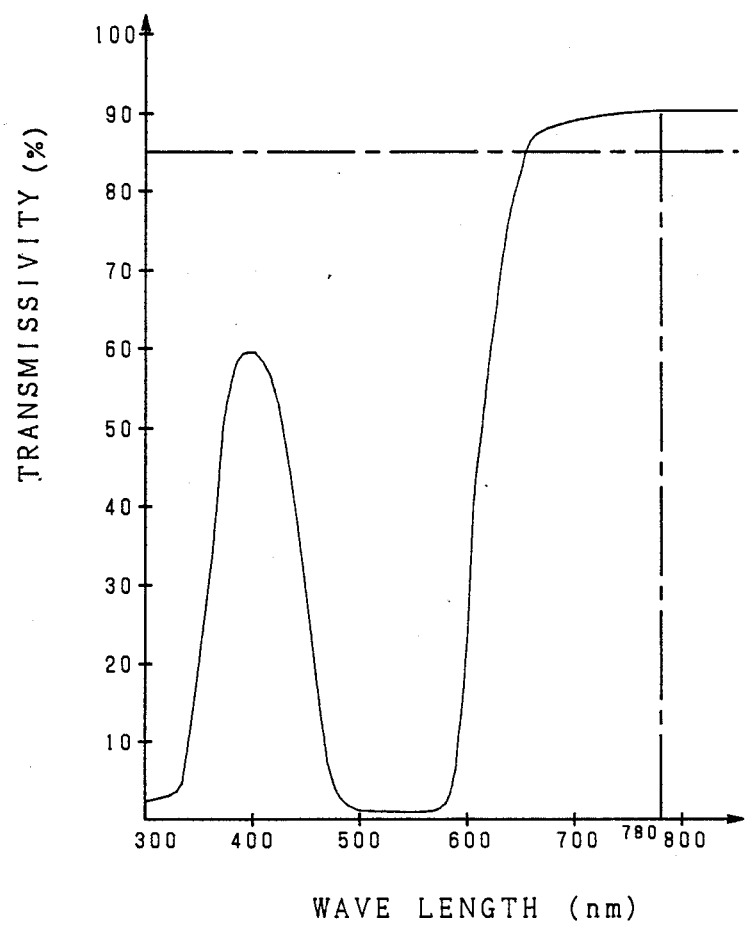
FIG. 5 is a diagram showing light transmission characteristics of a substrate of the optical recording disc according to the present invention.

In addition, a light absorption edge of short wave length region side of the substrate 1a is 600 nm or more. FIG. 5 shows transmission characteristics of the substrate 1a. The substrate 1a is tinged with translucent red. Here, the light absorption edge is a wave length (600 nm if FIG. 5) taking an average value (45.5% in FIG. 5) of a maximum transmissivity (90% in FIG. 5) and a minimum transmissivity (1% in FIG. 5).

This substrate 1a is obtained by uniformly blending anthraquinone dyestuffs of about 0.2% by weight with polycarbonate as a raw material and molding the resulting compound and tinged with translucent red.

It is preferable to add the dyestuffs in a ratio of 0.5% or less by weight. In addition, although the raw material of the substrate is not limited to one described in the above preferred embodiment, in the case where polycarbonate is used, only a process of adding the dyestuffs to this raw material is increased and other processes and facilities may be same as in the conventional one.

The dyestuffs to be added are not limited to one above described. Every dye tinged with red closer to violet to red closer to yellow meeting said optical conditions can be used. That is to say, the light absorption edge of 600 to 690 nm is good.

It is a reason why 600 nm is selected as a lower limit that the light absorption edge is positioned at wave lengths shorter than 600 nm, the light absorption edge is close to a peak value of energy of a natural light, whereby the effect of the natural light is reduced while if it is positioned at wave lengths longer than 690 nm, the original transmissivity of laser beam is undesirably influenced.

In addition, the present invention can be applied to various kinds of recording disc, such as recording disc of audio-video side, optical video disc and CD-ROM with literal and digital data recorded thereon, in addition to an audio compact disc.

As above described, according to the present invention, in the case where the natural light enters the optical system for reading the data recorded, its wave length showing the energy peak (600 nm or less) is in a side having a wave length shorter than the light absorption edge of shorter wave length side of the substrate according to the present invention, so that a level of the natural light, which reaches the reflecting film 2 and to be reflected from it, is remarkably suppressed. On the contrary, a sufficient quantity of laser beam irradiated from a reading light source is transmitted. Accordingly, according to the present invention, the data recorded can be read at a high S/N ratio. And, the reading device or its optical system can be the conventional one.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical recording disc, comprising:
   a substrate having a side with a surface on which data is recorded and another side with an opposite surface, said substrate having a single pass transmissivity within a predetermined wavelength region of a laser beam which enables the laser beam to reach the data for at least reading out the data when the laser beam is incident on the opposite surface; and
   means for suppressing effects of natural light during at least a reading out of the recorded data, said supressing means including a colorant within said substrate, said colorant having a light absorption edge at a wavelength less than said predetermined wavelength region so as to reduce transmissivity through said substrate of all wavelengths of visible natural light that are less than said wavelength of said light absorption edge.

2. An optical recording disc as set forth in claim 1, wherein said predetermined wavelength region includes a wavelength of about 780 nm.

3. An optical recording disc as set forth in claim 1, wherein said light absorption edge is within a range of 600 to 690 nm.

4. An optical recording disc as set forth in claim 1, wherein said substrate is formed of a compound comprising polycarbonate and red dyestuffs.

5. An optical recording disc as set forth in claim 4, wherein said red dyestuffs are anthraquinone dyestuffs.

6. An optical recording disc as set forth in claim 4, wherein said dyestuffs are contained in a ratio of 0.5% or less by weight.

7. An optical recording disc as set forth in claim 1, wherein said data recorded includes audio data.

8. An optical recording disc as set forth in claim 1, wherein said data recorded includes image data.

9. An optical recording disc as set forth in claim 1, wherein said data recorded includes data relating to letters and numeral values.

10. An optical recording disc as set forth in claim 1, further comprising:
    a reflecting layer on said substrate adjacent to said surface on which the data is recorded.

11. An optical recording disc as set forth in claim 1, wherein said light absorption edge is at a wavelength less than would adversely influence said single pass transmissivity of the laser beam.

12. An optical recording disc as set forth in claim 1, wherein said single pass transmissivity of said substrate is at least 85% in said predetermined wavelength region.

* * * * *